United States Patent
Buchal et al.

(10) Patent No.: US 9,200,529 B2
(45) Date of Patent: Dec. 1, 2015

(54) METHOD FOR ADJUSTING THE RADIAL GAPS WHICH EXIST BETWEEN BLADE AIRFOIL TIPS OR ROTOR BLADES AND A PASSAGE WALL

(75) Inventors: Tobias Buchal, Düsseldorf (DE); Björn Buchholz, Mülheim an der Ruhr (DE); Thomas Hille, Mülheim (DE); Anna Kapustina, Mülheim (DE); Mirko Milazar, Oberhausen (DE); Eric Schwerin, Bergen auf Rügen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 270 days.

(21) Appl. No.: 13/703,956

(22) PCT Filed: Jun. 9, 2011

(86) PCT No.: PCT/EP2011/059583
§ 371 (c)(1),
(2), (4) Date: Mar. 19, 2013

(87) PCT Pub. No.: WO2011/157622
PCT Pub. Date: Dec. 22, 2011

(65) Prior Publication Data
US 2013/0312249 A1    Nov. 28, 2013

(30) Foreign Application Priority Data
Jun. 14, 2010  (EP) ................... 10006147

(51) Int. Cl.
*G01R 31/28* (2006.01)
*H02K 15/00* (2006.01)
(Continued)

(52) U.S. Cl.
CPC .......... *F01D 11/14* (2013.01); *F01D 21/003* (2013.01); *F01D 21/04* (2013.01); *G01B 7/14* (2013.01); *F05D 2260/80* (2013.01); *G01B 2210/58* (2013.01); *Y10T 29/49004* (2015.01)

(58) Field of Classification Search
CPC ............. H01L 2924/01079; H01L 2924/14; H01L 2924/01013; Y10T 29/49009; Y02E 10/226; F01D 11/22
USPC .................. 29/593, 596; 415/1, 14
See application file for complete search history.

(56) References Cited

U.S. PATENT DOCUMENTS 4,804,905 A * 2/1989 Ding et al. ................ 324/662
5,382,911 A * 1/1995 Cotler et al. .............. 324/662
(Continued)

FOREIGN PATENT DOCUMENTS

| CN | 1206449 A | 1/1999 |
|---|---|---|
| CN | 101408114 A | 4/2009 |

(Continued)

*Primary Examiner* — David Angwin

(57) ABSTRACT

A method for measuring and adjusting gaps between a rotor and a stator of a machine using a sensor is provided. The measuring is conducted when the rotor is operated at a rotational speed below a nominal rotational speed of the machine and without the machine being in operation. The adjusting of the gap is carried out as a function of at least one gap dimension of the gap. The sensor is not resistant to an operating temperature of the machine occurring in a region where the sensor is located. After completion of the measuring the machine is operated with the sensor.

6 Claims, 2 Drawing Sheets

(51) Int. Cl.
*F04D 27/02* (2006.01)
*F01D 21/04* (2006.01)
*F01D 21/14* (2006.01)
*F01D 11/14* (2006.01)
*F01D 21/00* (2006.01)
*G01B 7/14* (2006.01)

(56) References Cited

U.S. PATENT DOCUMENTS

| | | | |
|---|---|---|---|
| 5,723,980 A * | 3/1998 | Haase et al. | 324/662 |
| 5,818,242 A * | 10/1998 | Grzybowski et al. | 324/642 |
| 6,168,385 B1 * | 1/2001 | Clamp | 417/9 |
| 6,401,460 B1 * | 6/2002 | Xia | 60/782 |
| 6,568,091 B1 * | 5/2003 | Mercer et al. | 33/1 PT |
| 6,692,222 B2 * | 2/2004 | Prinz et al. | 415/14 |
| 7,018,165 B2 * | 3/2006 | Milazar | 415/1 |
| 7,392,713 B2 * | 7/2008 | Barkhoudarian | 73/862.331 |
| 7,503,179 B2 * | 3/2009 | Estridge et al. | 60/782 |
| 7,597,537 B2 * | 10/2009 | Bucaro et al. | 415/173.2 |
| 7,808,233 B2 * | 10/2010 | Jensen | 324/207.25 |
| 7,824,147 B2 * | 11/2010 | Morris et al. | 415/1 |
| 2003/0094956 A1 * | 5/2003 | Orenstein | 324/644 |
| 2009/0289620 A1 * | 11/2009 | Suckling et al. | 324/207.16 |
| 2015/0152743 A1 * | 6/2015 | Luttenberg | |
| 2015/0167487 A1 * | 6/2015 | Willett et al. | |

FOREIGN PATENT DOCUMENTS

| | | |
|---|---|---|
| EP | 0806680 A2 | 11/1997 |
| EP | 1314957 A2 | 5/2003 |
| GB | 2460248 A | 11/2009 |
| JP | 2000097352 | 4/2000 |
| JP | 2000097352 A | 4/2000 |
| JP | 2000136925 A | 5/2000 |
| JP | 2009293784 A | 12/2009 |
| RU | 2280238 C1 | 7/2006 |
| RU | 2375675 C1 | 12/2009 |
| SU | 1663404 A1 | 7/1991 |
| SU | 1670370 A1 | 8/1991 |
| SU | 1779908 A1 | 12/1992 |
| WO | WO 2010017893 A1 | 2/2010 |

* cited by examiner

METHOD FOR ADJUSTING THE RADIAL GAPS WHICH EXIST BETWEEN BLADE AIRFOIL TIPS OR ROTOR BLADES AND A PASSAGE WALL

CROSS REFERENCE TO RELATED APPLICATIONS

This application is the US National Stage of International Application No. PCT/EP2011/059583 filed Jun. 9, 2011, and claims the benefit thereof. The International Application claims the benefits of European Patent Application No. 10006147.2 EP filed Jun. 14, 2010. All of the applications are incorporated by reference herein in their entirety.

FIELD OF INVENTION

The invention relates to a method for adjusting the radial gaps which exist between blade airfoil tips of rotor blades and a passage wall of axial throughflow turbomachines, wherein the adjustment of the radial gaps is carried out as function of at least one gap dimension of one of the existing radial gaps which is measured by at least one sensor.

BACKGROUND OF INVENTION

Such a method is known from U.S. Pat. No. 4,804,905, for example. For this purpose, a capacitive sensor, which can sense the distance from the blade airfoil tips for each passing rotor blade during operation of the gas turbine, is arranged in a housing of the turbine which delimits the flow path. If an excessively large radial gap is detected, the conical housing is shifted axially by means of hydraulic actuators for reducing the gap. It is disadvantageous, however, that only one measuring point per sensor can be sensed on the circumference of the housing so that at least four sensors are required per stage. Also, when using four sensors, only a rough statement can then be made about the gap distribution on the circumference. Therefore, the gap between the measuring points can only be interpolated or estimated, for example. A further disadvantage of said solution is that on account of the secure fastening of the sensors the construction is comparatively complex and expensive since the detecting of the radial gaps is carried out during operation of the gas turbine and cooling of the sensors is required so that these can permanently withstand the temperatures which meanwhile occur.

Also, it is known from EP 0 806 680 A2 and from GB 2460248 A to carry out this measuring not during operation of the turbomachine but before it or after it.

SUMMARY OF INVENTION

It is an object to provide a method by which radial gap measuring is made possible on the entire circumference of the housing with exceptionally little means so that a comparatively small radial gap between blade airfoil tips of rotor blades and the passage wall opposite these can be achieved for achieving improved efficiency of the turbomachine. It is a further object to disclose an efficient, time-saving method for adjusting the radial gaps during assembly of the turbomachine or during its maintenance in order to increase the availability of the turbomachine.

The object which is directed towards the method is achieved by the at least one sensor not being resistant to temperature with regard to the operating temperature which occurs in the region of the sensor during operation of the machine, and after completion of the measuring the machine is operated with the sensor located therein. The method in this case is exceptionally advantageous for measuring and adjusting the necessary gaps during assembly of turbomachines, in which gap measuring is required in the completely assembled state and no access from the outside or no device is available for continuous radial gap adjustment.

A particular advantage of the invention is that the sensors which are used can be simply and inexpensively designed since these are operated only at the normal ambient temperatures, that is to say up to 80° C. in the worst case. Their maximum permissible operating temperature therefore lies far below the temperatures which occur during machine operation at that point at which they are located. After the measuring of the gap dimensions and the setting of the desired gap dimensions the sensors remain in the machine for the time being. The machine is then operated in a normal manner despite the installation of the sensors which are not resistant to temperature. The sensors are destroyed in the process and therefore removed from the machine in an unconventional manner. A time-consuming disassembly of the sensors is saved, which significantly increases availability.

The method enables the turbomachine to be assembled with predetermined radial gaps which are as accurate as possible and which otherwise would turn out to be actually larger on account of manufacturing-related tolerances. The method is preferably also used for measuring the radial gap in a turbomachine which is designed as a turbine, as a gas turbine, or as a compressor.

Understood by operation of the turbomachine in this case is that this is used in a normal manner in the meantime. If the measuring of the radial gaps is carried out without the gas turbine or turbomachine being in operation, this means, in detail, that if the turbomachine is designed as a turbine or gas turbine, for example, no hot operating medium flows through its flow path. For a compressor, this means that the temperatures which occur during operation are fallen far short of. As a rule, the necessary gap measuring is carried out at room temperature so that the sensors which are used do not have to have particular resistance with regard to temperature (temperature up to 80° C.).

The nominal rotational speeds of gas turbines which are provided for power generation are, for example, 3000 $\text{min}^{-1}$ (at 50 Hz mains frequency) or 3600 $\text{min}^{-1}$ (at 60 Hz mains frequency). According to the method according to the invention it is provided that the rotor rotational velocity (rotor rotational speed) is significantly lower than the nominal rotational speed of the turbomachine. The rotational speed can preferably be selected above a so-called blade rattling speed so that the blades reach their operating position during the measuring. As a result of this, functional disturbance parameters when the gaps are being measured (such as rattling of rather loosely seated rotor blades at low rotational speeds) can be avoided so that actual functional gaps can be determined. The rotational speed can be 120 $\text{min}^{-1}$ or even less. A rotational speed which is higher than 120 $\text{min}^{-1}$ is not excluded, however. This enables the use of particularly inexpensive sensors with a comparatively low time resolution.

The invention is based on the knowledge that a temperature resistance of the sensor is not necessary since the radial gaps of the turbomachine are not continuously measured and adjusted online, i.e. during operation of the turbomachine, but only on a one-time basis during assembly of the turbomachine in each case, e.g. during a rebuild or after an inspection. For the one-time adjustment of the radial gaps during assembly, the passage walls or the housing of the flow path of the turbomachine and the tips of the blade airfoils of the rotor blades can be arranged in different positions in relation to each other, wherein the positioning is carried out with the aid of shims of different thickness or correspondingly adjustable guide systems, for example. Since the radial gaps of the turbomachine have to be readjusted only during initial assembly or after each maintenance of the turbomachine has been carried out, it is sufficient that the sensors which are used for this purpose have only a resistance to room temperature but not a resistance to the temperatures which occur at the measuring point during operation of the turbomachine.

A particular advantage of the invention lies in the fact that such sensors are meanwhile also available in manufactured forms consisting of material which disintegrates into particles of mainly dust particle size when a limiting temperature is exceed. Therefore, after the measuring of the radial gaps the sensors which are used can remain inside the turbomachine and do not have to be removed by a fitter. This saves assembly costs and reduces the product times or downtimes of the turbomachine. The disintegration into particles of dust particle size then occurs during commissioning of the turbomachine, for example, since in this case the forces occurring then and the temperatures lie far above the operational conditions and temperatures of the sensor and consequently destroy these in a disintegrating manner. The particles are then carried out of the turbomachine with the medium.

A further essential advantage is that the sensors do not have to be embedded into the components, e.g. into rotor blades. Rather, the sensors, regardless of their size, can be attached and fixed on the surface of the rotor blades since the turbomachine is not operated in a normal manner during their installation.

The proposed method is especially advantageous for those blade rings in which accessibility for the fitter is not provided or is very difficult on account of the axial type of construction of the turbomachine.

Consequently, at least one blade of each blade ring of the turbomachine can be equipped with a sensor, as a result of which the gap dimension of the radial gaps of the entire circumference (360°) can be determined for each blade ring. The measuring points do not have to be reduced to just a few.

A further advantage of the invention lies in the fact that the sensors do not have to be wear-resistant. In principle, it is sufficient if the sensor can determine the gap dimension just for a small number of revolutions and the desired gap setting can be reliably adjusted as a result.

Overall, the sensors serve virtually as disposable sensors which are used according to requirement on a one-time basis before operation of the machine and are then removed from the machine by means of thermal destruction. The omission of disassembly of the sensors increases the availability of the machine. Moreover, the precisely set gap dimensions limit inevitable flow losses during operation of the machine.

The sensor is preferably arranged on a rotor blade. As a result of this, the radial gap in question can be detected for the entire revolution, as a result of which a more accurate indication of the rotor position inside the housing is also possible. In other words, for each angular position of the sensor (on the circumference), a gap dimension of the radial gap can be detected.

The sensor is preferably designed as an RFID sensor, as a result of which a cable-free radio transmission of the detected radial gaps of the gas turbine, or of the measured values which represent the radial gaps, to a stationary evaluating unit is possible.

Naturally, the idea according to the invention can also be used outside the field of turbomachines, for example in an electric generator, the radial gap of which between stator and rotor should also be small whenever possible. Regardless of this, it is also conceivable to use the method or the device for axial gap determination.

Overall, the invention discloses a method for adjusting radial gaps of a turbomachine which exist between blade airfoil tips of rotor blades and a passage wall during assembly of the turbomachine, in which the radial gaps are detected before putting commissioning of the turbomachine, and the components which form the radial gap are fixedly arranged in relation to each other so that a predetermined permissible radial gap is set during assembly. There is no provision for online radial gap minimization in the sense of a continuous adjustment during operation of the turbomachine.

BRIEF DESCRIPTION OF THE DRAWINGS

The invention is explained in more detail with reference to the following figures. In the drawing.

DETAILED DESCRIPTION OF INVENTION

Figure 1:
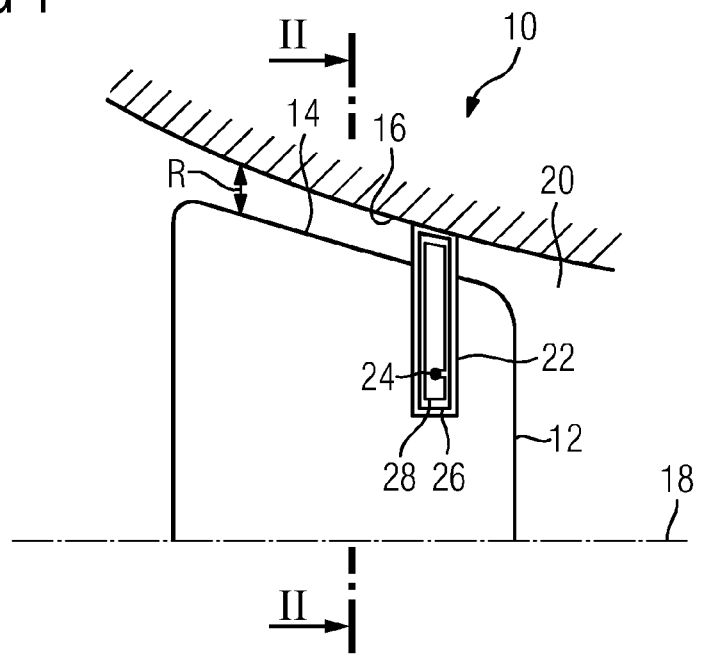
FIG. 1, FIG. 2 show a longitudinal section and cross section through the flow path of a compressor

FIG. 1 shows the longitudinal section through a detail of a compressor 10. The compressor 10 belongs to axial throughflow turbomachines and has rotor blades 12 which are arranged radially on a rotor, which is not additionally shown, forming a ring. The rotor blades 12, unshrouded, are designed with a blade airfoil tip 14 which lies opposite a passage wall 16, forming a radial gap. The passage wall 16 is formed concentrically to the machine axis 18 and radially on the outside delimits a flow path 20 of the compressor 10, in which flow path the medium which is to be compressed is delivered by the compressor 10. The passage wall 16 in this case is of an essentially convergent design. A sensor 22 is provided on the blade airfoil of the rotor blade 12 on the tip side.

The sensor 22 in this case comprises a transmitting and receiving unit 24 which is arranged on a film 26, for example. In addition, an electrically conducting strip conductor 28 is attached on the film 26 and is electrically connected to the transmitting/receiving unit 24. The sensor 22 in this case projects beyond the tip 14 of the rotor blade 12 and bears against the passage wall 16 in the process.

Figure 2:
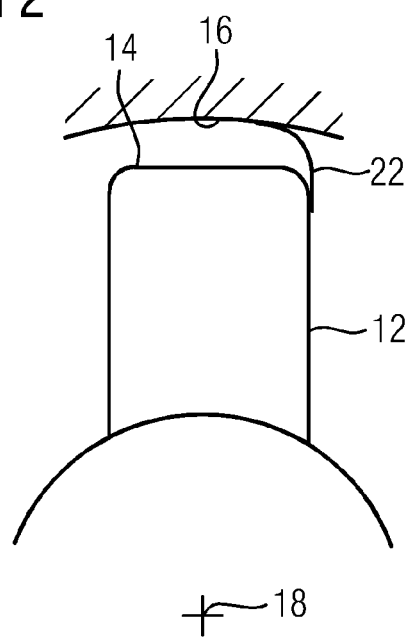

As shown in cross section according to FIG. 2, the sensor 22, and especially its electrical conductor 28, is bent in the tangential direction, wherein the bend of the conductor 28 depends upon the distance between the blade tip 14 and the passage wall 16. The degree of bend of the electrical conductor 28 leads to a change of its electrical properties. This electrical property, or a value which is dependent thereupon, is detected by the transmitting/receiving unit 24. Its value then serves as a dimension for the radial gap R. The bend of the electrical conductor 28 which is detected by the sensor 22 is therefore converted into an electrical value which the sensor 22 transmits, by means of the transmitting/receiving unit 24, to an immovably arranged evaluating and receiving unit, which is not shown.

The power supply of the sensor 22 can also be carried out in this case via the transmitting/receiving unit 24, as is customary in the case of RFID sensors. By means of the gap dimension detected in this way, the relative position of the passage wall in relation to the rotor blade airfoil tip can then be adjusted by means of the mentioned shims or an adjustment system so that a desired gap distribution on the entire circumference (360°) can be set. After completion of the gap measuring and adjusting of the gaps to the desired gap dimension, the compressor 10 is operated with the sensor 22 located therein. During this, operating temperatures occur in the region of the sensor which lie far above the maximum permissible operating temperature of the sensor 22. On account of the sensor 22 not being resistant to temperature, this is destroyed. It disintegrates into small particles and is therefore removed from the machine in a service-friendly manner without fitters having to spend working time thereupon.

Figure 3:
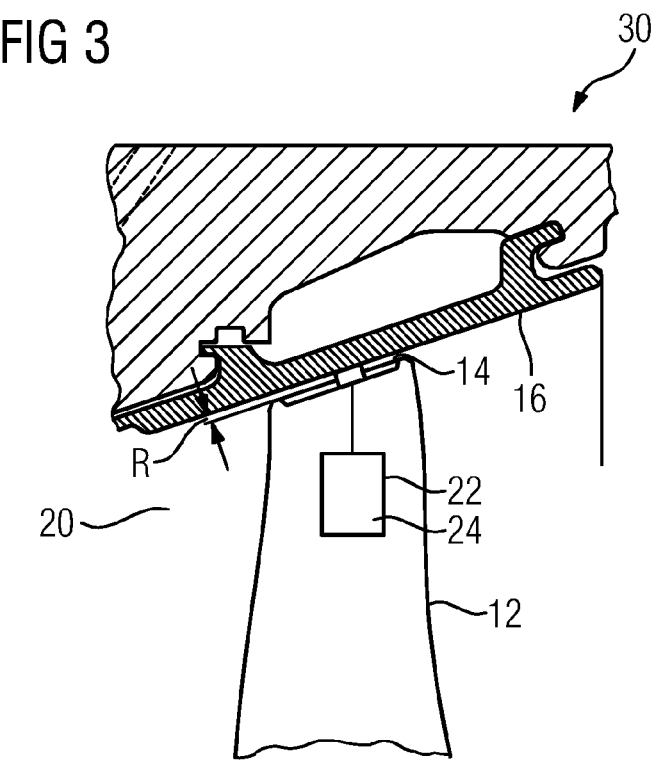
FIG. 3, FIG. 4 show the longitudinal section and cross section through the flow path of a turbine.
Figure 4:
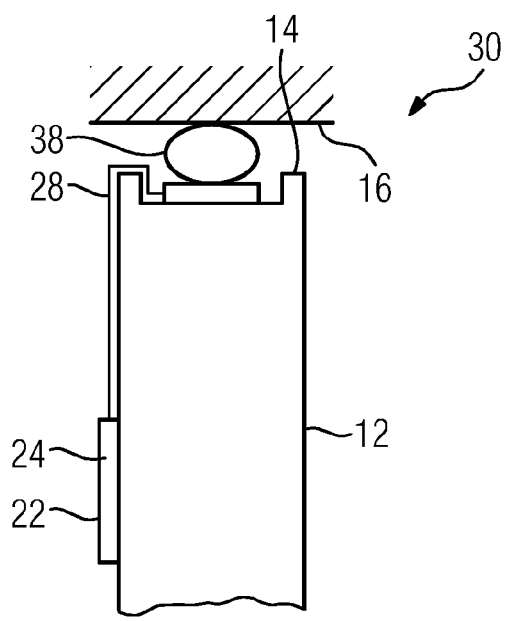

An alternative embodiment of the invention is shown in FIGS. 3 and 4, wherein FIG. 3 shows the longitudinal section through a turbomachine which is designed as a turbine 30 and FIG. 4 shows the corresponding cross section thereof. In this case, components of the compressor 10 and of the turbine 30 which correspond to each other are provided with identical designations. Corresponding to the first embodiment which is described in FIG. 1 and FIG. 2, the sensor 22 according to the second embodiment shown in FIG. 3 and FIG. 4, has a strip conductor 28 which is vapor-deposited on a plastic film. According to the second embodiment, the plastic film, however, is also formed as a loop 38, wherein the electrical resistance of the strip conductor 28 which is vapor-deposited thereupon is altered on account of its compression/deformation. The alteration of the resistance is then once more a dimension for the distance R between the blade airfoil tips 14 and the passage wall 16 lying opposite it. The gap dimensions which are detected by the sensor 22, or the electrical voltage values which represent the gap dimensions, can be radiated by means of an antenna 24, integrated in the sensor 22, onto an external, statically arranged receiving, evaluating and indicating device, which is not shown.

The power supply of the sensor 22 can be generated in this case via an inbuilt micro-battery or by means of the deformation of the sensor 22 itself. It is also possible in this embodiment to apply the feed means of electric energy which is known from RFID technology.

The antenna 24 of the sensor 22 is adhesively attached either on the suction side or on the pressure side of the rotor blades 12 in order to ensure the best possible direct radiation of the antenna 24.

With the two aforesaid embodiments, it is possible to carry out a continuous detection and transmission of the measurement results, i.e. to transmit the physical values which represent the gap dimension of the radial gaps R to the external evaluating and indicating device. Consequently, it is possible during assembly or final inspection of the turbomachine 10, 30—that is to say only in the cold state and under very low centrifugal force action—to detect the gap dimension of the radial gaps R between the tips 14 of the rotor blades 12 and the outer wall 16 of the flow path by means of the proposed in situ sensors 22. Since the turbomachine 10, 30 does not have a device for continuous radial gap adjustment anyway, accordingly the sensors 22 which are used do not have to be able to withstand those temperatures which usually occur at the corresponding places at which they are attached during operation of the turbomachine 10, 30.

The invention claimed is:

1. A method for measuring and adjusting gaps between a rotor and a stator of a machine, comprising:
   providing a sensor;
   measuring a gap between the rotor and the stator using the sensor, wherein the measuring is conducted when the rotor is operated at a rotational speed below a nominal rotational speed of the machine and without the machine being in operation; and
   adjusting the gap, wherein the adjusting of the gap is carried out as a function of at least one gap dimension of the gap,
   wherein the sensor is not resistant to an operating temperature of the machine occurring in a region where the sensor is located, and
   wherein after completion of the measuring the machine is operated with the sensor.

2. The method as claimed in claim 1, wherein a radial gap in a turbine and/or in a compressor is measured.

3. The method as claimed in claim 1, wherein the method is carried out before commissioning of the machine and/or before an initial startup of the machine after maintenance.

4. The method as claimed in claim 1, wherein the rotational speed of the rotor is equal to or less than 120 min$^{-1}$.

5. The method as claimed in claim 1, wherein the machine is an axial throughflow turbomachine and the gap between the rotor and the stator is located between rotor blades and a passage wall.

6. The method as claimed in claim 1, wherein a radial gap in a turbine or in a compressor is measured.

* * * * *